United States Patent

[11] 3,540,750

[72] Inventor  Paul J. Berger
  2318 Pleasant, Missoula, Montana 59801
[21] Appl. No. 714,834
[22] Filed  March 21, 1968
[45] Patented  Nov. 17, 1970

[54] SKI VEHICLE
  4 Claims, 8 Drawing Figs.
[52] U.S. Cl. ....................................... 280/16
[51] Int. Cl. ..................................... B62b 13/14
[50] Field of Search ............................ 280/16, 21

[56]       References Cited
       UNITED STATES PATENTS
2,619,358  11/1952  Telenik ........................ 280/16
2,905,479  9/1959  Schomers ..................... 280/16

FOREIGN PATENTS
173,615  1/1953  Austria ........................ 280/21

Primary Examiner—Banjamin Hersh
Assistant Examiner—Robert R. Song
Attorney—Cushman, Darby & Cushman ABSTRACT: A ski vehicle, which may be towed, propelled by gravity or self-propelled, is mounted on a pair of rear skis pivotally carried and interconnected by parallel linkage to enable vertical movement of one ski relative to the other for banking of the vehicle and to enable the skis to be pivoted into a snow-plow position for braking and a third ski located forward of the pair of skis for steering the vehicle with the pair of skis and the third ski being controlled by control pedals, a control wheel and a control column located in a cockpit of the vehicle.

Patented Nov. 17, 1970

INVENTOR
PAUL J. BERGER
BY Cushman, Darby Cushman
ATTORNEYS

Patented Nov. 17, 1970

INVENTOR
PAUL J. BERGER
BY Cushman, Darby & Cushman
ATTORNEYS

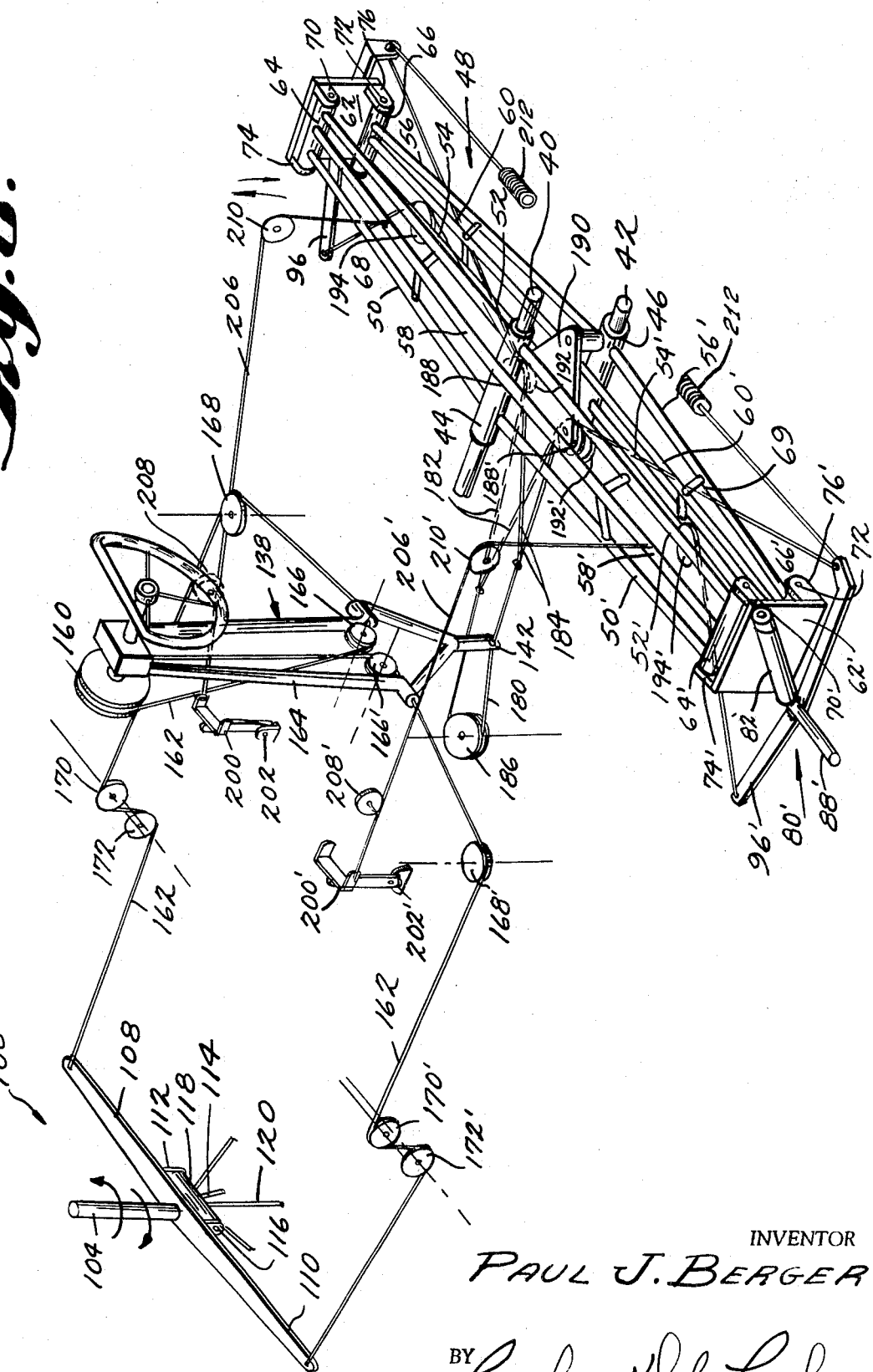

SKI VEHICLE

BRIEF DESCRIPTION OF THE INVENTION

This invention relates to a ski vehicle and, more particularly, to a ski vehicle having steering, banking and braking means to enable the operator to have complete control of the vehicle during operation.

Applicant has invented a ski vehicle which is highly maneuverable and easy to control through unique steering, banking and braking assemblies that can be easily controlled from the cockpit of the vehicle. The present invention, while exhibiting the desired characteristics of high maneuverability and ease of control is also inexpensive and dependable due to the unique design of the control and ski mounting assemblies which allow the use of relatively uncomplicated components to achieve the desired results.

Briefly, the preferred embodiment of the present invention comprises a tubular frame mounted on three skis. Two of the skis are connected to the rear portion of the frame by means of parallel linkage which permits either of the skis to be elevated relative to the other ski for the purpose of banking. These two skis are pivotally mounted on inclined axes at the terminal portions of the parallel linkage so that the skis may also be simultaneously pivoted into a snow-plow position for braking. The third ski is pivotally mounted on the forward end of the frame to enable the vehicle to be steered.

The banking of the vehicle is controlled by foot pedals interconnected to the parallel linkage by means of cable and pulley assemblies so that vertical movement of the skis relative to each other is equal and opposite. The braking of the vehicle is controlled by a control column which is interconnected to the rear skis by means of cable and pulley assemblies so that when the column is pulled back from its normal operating position, the skis are drawn into a snow-plow position. The steering of the vehicle is controlled by a wheel on the control column with the wheel being interconnected with the forward ski by cable and pulley assemblies. During operation of the ski vehicle, the wheel is turned clockwise or counterclockwise in a conventional manner to effect a right or left hand turn of the vehicle.

The above objects and advantages of the present invention will be better understood and other objects and advantages of the present invention will become apparent from the following detailed description when taken in conjunction with the accompanying drawings in which:

FIG. 5 is an enlarged perspective view of one end of the parallel linkage showing the manner in which the rear skis are mounted on the parallel linkage;

FIG. 6 is a side view of the control column showing the connection of the control column to the brake cables;

FIG. 7 is a view of the control column and wheel taken substantially along line 7-7 of FIG. 6 and showing a portion of the steering assembly; and FIG. 8 is a schematic view showing the overall control system for steering, banking and braking.

DETAILED DESCRIPTION OF THE INVENTION

Figure 1:
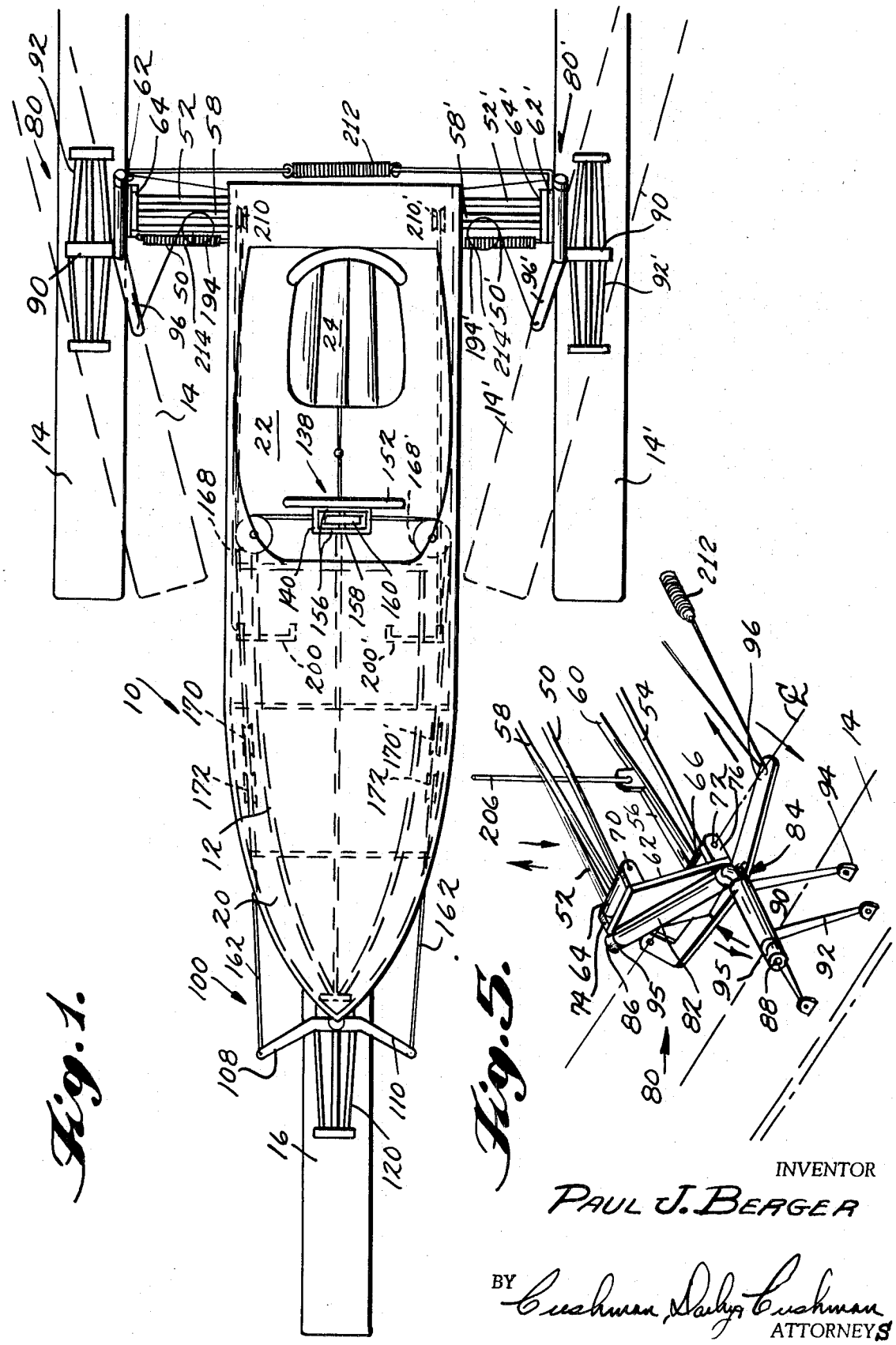
FIG. 1 is a plan view from above of the ski vehicle showing the rear skis in both the normal and the snow-plow position (dashed line position)
Figure 2:
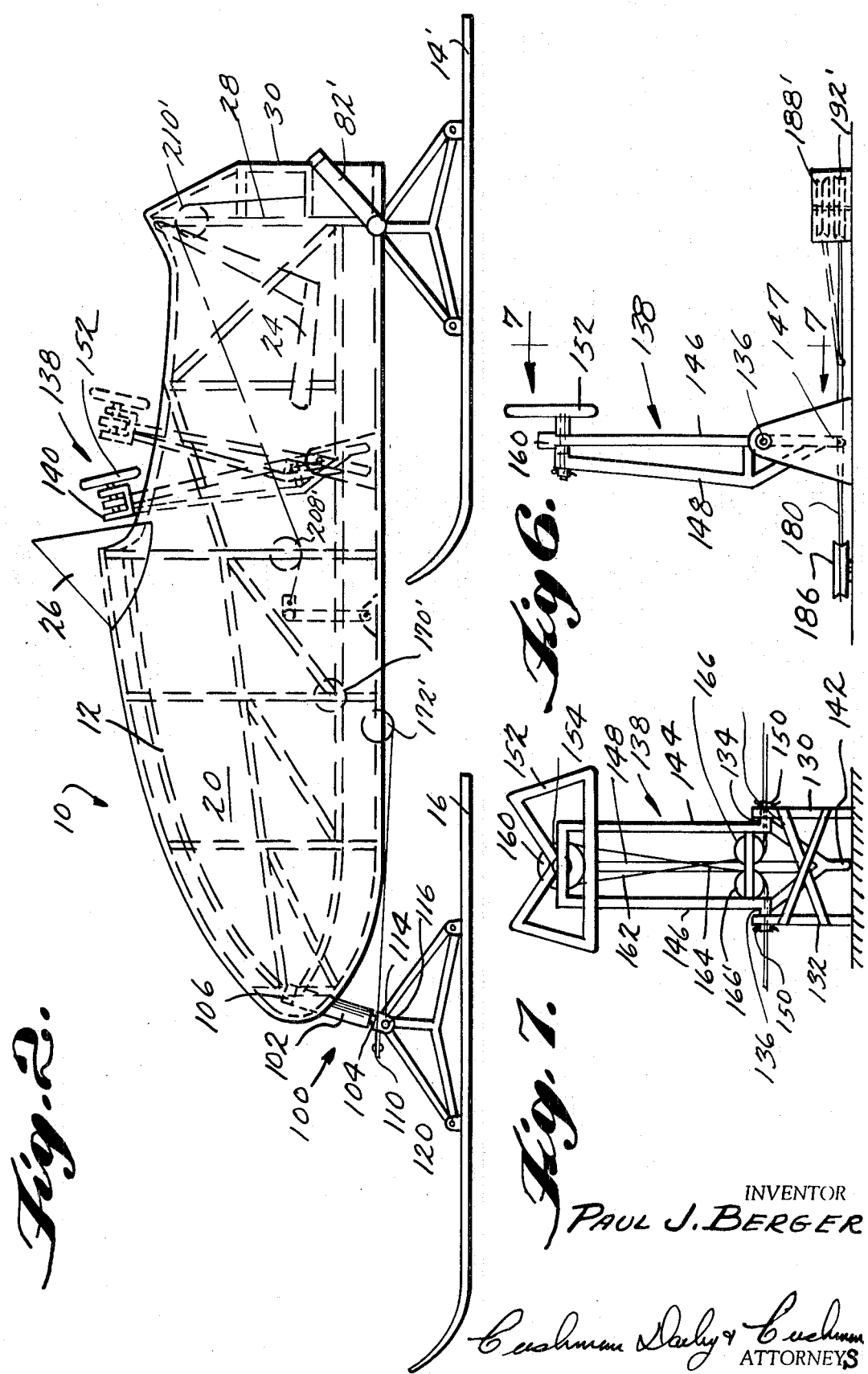
FIG. 2 is a side elevational view of the ski vehicle showing the control column in its normal position and in its braking position (dashed line position)
Figure 3:
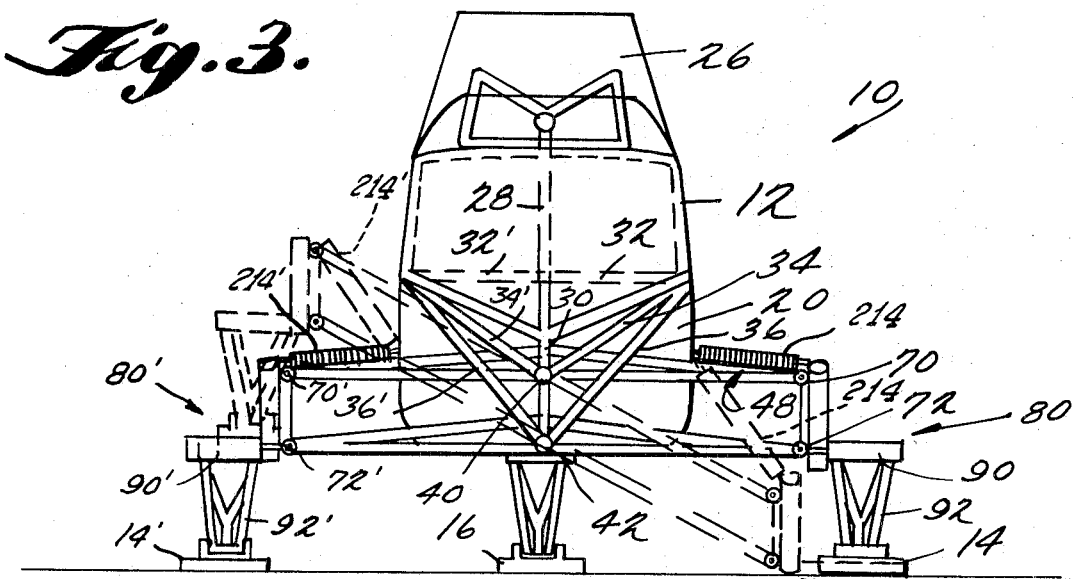
FIG. 3 is an end view of the vehicle taken from the rear end showing the rear skis in the normal position and in a bank position (dashed line position)

Referring now to the drawings, and more specifically, to FIGS. 1 through 3 of the drawings, a preferred embodiment of the invention is illustrated. In its preferred form the ski vehicle 10 comprises a welded tubular frame 12 mounted on skis 14, 14' and 16. The tubular frame can be covered with a fabric covering 20, sheet metal panels or other suitable covering means to protect the occupant of the vehicle from the elements and give the ski vehicle a streamlined and pleasing appearance. In addition, the vehicle is provided with a cockpit 22 having a seat 24 from which the controls of the ski vehicle 10 can be easily operated and a windscreen 26 to further protect the occupant from the elements.

The rear end of the ski vehicle is provided with a pair of vertical spaced-apart struts 28 and 30 located along the longitudinal center line of the ski vehicle. Inner strut 28 is suitably braced by transverse struts 32, 32' and the like, while outer strut 30 is braced by means of struts 34, 34', 36, 36' and the like.

Pivot pins 40 and 42 pass through struts 26 and 28 are welded or otherwise suitably secured to the struts. These pivot pins, in turn, carry sleeves 44 and 46 of parallel linkage 48 with the sleeves 44 and 46 being slidably received on the horizontally extending pins 40, 42 thereby insuring that the parallel linkage 48 can pivot relative to pivot pins 40, 42 during a banking maneuver of the vehicle.

Parallel linkage 48 comprises pairs of upper rod members 50, 52, 50', 52', lower rod members 54, 56, 54', 56' that extend in a plane parallel to the plane of the upper rod members; upper and lower diagonal bracing rod members 58, 58' and 60, 60', respectively, and parallel end plates 62, 62'. Rod members 50, 52 and 50', 52' are welded or otherwise rigidly secured at their inner ends to sleeve 44 and at their outer ends to sleeves 64 and 64', respectively. Rod members 54, 56 and 54', 56' are welded or otherwise rigidly secured at their inner ends to sleeve 46 and at their outer ends to sleeves 66 and 66', respectively. Upper diagonal bracing rod members 58, 58' are welded or otherwise rigidly secured to each other at their inner ends, to sleeves 64 and 64', respectively, at their outer ends and to struts 68 which extend between members 58, 58' and rod members 50, 52, 50' and 52', the struts 68 being welded to rod members 50, 52, 50' and 52'. Lower diagonal bracing rod members 60, 60', like rod members 58, 58' are welded or otherwise rigidly secured to each other at their inner ends, to sleeves 66 and 66', respectively, at their outer ends and to struts 69 which extend between members 60, 60' and rod members 54, 56, 54' and 56', the struts 69 being welded to rod members 54, 56, 54' and 56'.

Sleeves 64 and 66 are, in turn, pivotally mounted on pivot pins 70 and 72, while sleeves 64' and 66' are pivotally mounted on pivot pins 70' and 72'. Pins 70 and 72 extend between and are welded or otherwise secured to lugs 74 and 76 of end plate 62 whereby end plate 62 interconnects one end of the upper and lower rod members. In the same manner, pins 70' and 72' are secured to lugs 74' and 76' of end plate 62' thereby completing the linkage. Pivotal movement of the parallel linkage 48 about the longitudinal centerline of the vehicle enables one side of the linkage to be elevated with respect to the other, while the end plates 62, 62' remain in substantially parallel vertical planes.

Skis 14 and 14' are mounted on end plates 62, 62' by mounting assemblies 80, 80'. Since the assemblies 80 are similar in construction, it is to be understood that the following description of assembly 80, as shown in FIG. 5, applies also to assembly 80', the unprimed and primed reference characters of assemblies 80 and 80' representing like components.

Referring now to FIG. 5, an inclined sleeve 82 is welded or otherwise rigidly secured to the outer surface of end plate 62 with the tube extending diagonally across the plate from adjacent the upper rear corner of the plate to the lower front corner of the plate. A substantially L-shaped shaft 84 is pivotally received within sleeve 82 with one arm 86 being carried within the sleeve and the other arm 88 extending outwardly from the lower end of the sleeve in a substantially horizontal direction when the skis are in their normal position. The outwardly extending arm 88 is received within a sleeve 90 that is, in turn, secured to the upper surface of ski 14 by means of diagonal braces 92 which are welded to the sleeve and bolted or otherwise rigidly secured to lugs 94 of the ski 14.

Sleeves 95, caps or other fastening means are welded or otherwise secured to the ends of arms 86 and 88 to maintain the arms in sleeves 82 and 90. With the above assembly ski 14 can pivot, relative to end plate 62, about the axis of sleeve 90 and sleeve 82 to enable the ski to follow the contour of the ground and to enable ski 14 to be pivoted into a snow-plow position.

A control lever 96 of the braking system is welded or otherwise rigidly secured to its midportion to arm 88 of shaft 84 adjacent the juncture of arms 86 and 88. In the normal operating position, the forward end of the control arm 96 extends somewhat inwardly from its juncture with shaft 84 and is provided with an aperture for mounting a control cable, while the rear portion of the arm extends substantially parallel to end plate 62 until its terminus where the arm projects inwardly and is provided with an aperture for receiving a control cable. The rear portion of control lever 96 normally contacts plate 62, which acts as a stop, to keep ski 14 properly positioned during the operation of the vehicle.

Forward ski 16 is pivotally mounted on the forward end of the ski vehicle by mounting assembly 100. Assembly 100 comprises a tubular element 102 that is welded or otherwise rigidly secured to the tubular frame 12 of the vehicle and depends diagonally from the forward end of the vehicle. Shaft 104 is rotatably received within tube 102, the shaft being retained in tube 102 by sleeve 106 which can be welded or otherwise secured to the shaft. The lower end of the shaft is provided with a pair of arms 108, 110 extending outwardly to either side of the shaft and then forward with the outer terminal portion of each arm being provided with an aperture for control cables. The underside of these arms adjacent their juncture are provided with spaced-apart lugs 112, 114 which carry a pivot pin 116 for pivotally securing sleeve 118 to the frame. Sleeve 118, in turn, is interconnected to ski 16 by diagonal struts 120 which are welded or otherwise rigidly secured to the sleeve 118 at their upper ends and bolted or otherwise rigidly secured to ski 16 at their lower ends.

The cockpit 22 is provided with a pair of spaced-apart brackets 130, 132 which are welded or otherwise rigidly secured at their lower edges to members of tubular frame 12 and reinforced by elements 133. The upper portions of brackets 130, 132 are provided with apertures through which extend hollow bushings 134, 136 that are utilized to pivotally mount control column 138, intermediate its upper and lower ends, between the spaced-apart brackets.

Control column 138 comprises an upper rectangular frame 140, a lug 142 adapted to be connected to a control cable and three shafts 144, 146 and 148 depending from the rectangular frame 140 and coming together at lug 142. Shafts 144 and 146 of the control column are provided with apertures located adjacent but spaced from the juncture of the three control column shafts.

Hollow bushings 134, 136 extend through these apertures with the bushings being retained within the brackets 130, 132 and shafts 144, 146 by means of snap rings 150, cotter pins or other suitable retaining devices. With the above assembly, when the upper portion of the control column is pulled rearward, the portion of the control column below the pivotal mounting moves forward actuating a control cable as will be more fully explained hereinafter.

A steering wheel 152 is mounted on the upper end of the control column. The wheel 152 is rigidly secured to a shaft 154 that extends through and is pivotally retained within members 156 of rectangular frame 140. The shaft is retained within the frame by snap ring 158, cotter pins or similar fastening means. A cable drum 160 is rigidly affixed to the shaft 154 intermediate rectangular frame member 156 so that turning of the steering wheel will effect a similar turning movement of the cable drum 160.

The steering of the vehicle is controlled by steering wheel 152 through drum 160 and cable 162 which leads from the drum 160 to the ends of arms 108 and 110 of mounting assembly 100 where the cable passes through the apertures provided in arms 108 and 110 and is secured to these arms. The midportion of cable 162 is wrapped around drum 160 after which the two outer portions of the cable are crossed at point 164 and passed about pulleys 166, 166', respectively, that are mounted on control column 138 adjacent hollow bushings 134 and 136. One of the outer portions of the cable then passes out through hollow bushings 134, around pulleys 168, 170, 172 that are mounted on tubular frame 12, and is secured at its end to arm 108. The other outer portion of the cable 162 passes out through hollow bushing 136, around pulleys 168', 170', 172', that are mounted on tubular frame 12, and is secured at its end to arm 110.

Figure 4:
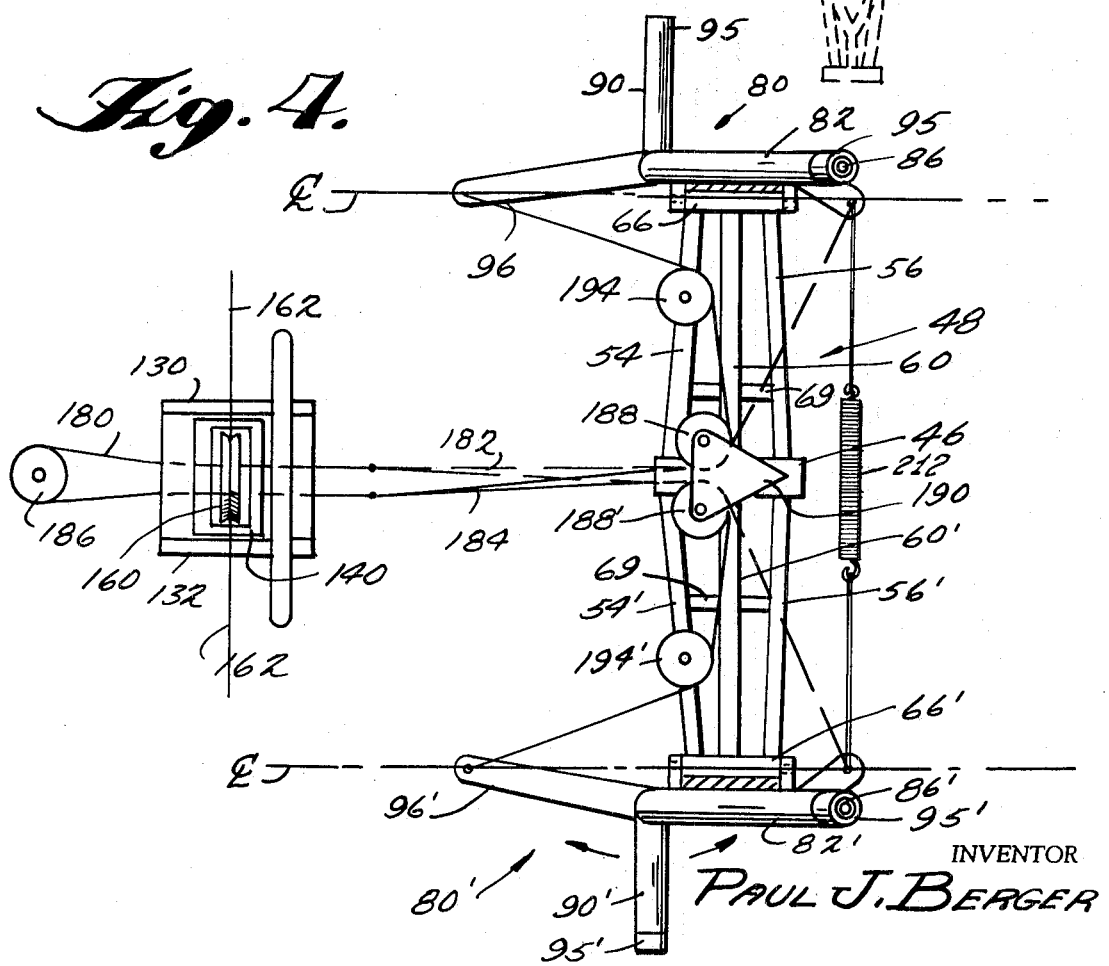
FIG. 4 is a plan view in detail illustrating the control assembly for the vehicle braking system.

The braking of the vehicle is controlled by control column 138 which is interconnected with control levers 96 and 96' by means of cables 180, 182 and 184. Cable 180 is fixedly secured to lug 142 of control column 138 and passes around pulley 186 mounted on the tubular frame 12 forward of the control column. The cable 180 is connected at one end to cables 182 and at the other end to cables 184 with cables 182 being connected to the rear portions of arms 96, 96' and cables 184 being connected to the forward portion of arms 96, 96'. Cables 182 pass around upper pulleys 188, 188' that are mounted on plate 190 which, in turn, is secured to parallel linkage 48. Control cables 184 pass about lower pulleys 192, 192' that are secured to plate 190; pulleys 194, 194' that are mounted on lower rod members 54 and 54' of the parallel linkage and are secured to the forward portions of arms 96, 96'. As shown in FIGS. 1, 4 and 8, spring 212 is connected to the rear portions of arms 96, 96' to aid in returning the skis 14, 14' to a normal position after braking.

The banking of the vehicle is controlled by pedals 200 and 200' which are pivotally mounted on lugs 202, 202' of tubular frame 12. Pedal 200 is connected to member 60 of parallel linkage 48 through cable 206, while pedal 200' is connected to member 60' of parallel linkage 48 through cable 206'. Cable 206 is guided by pulleys 208 and 210 that are mounted on the tubular frame 12 while cable 206' is guided by pulleys 208', 210' which are likewise mounted on the vehicle frame 12. With this arrangement, the motion of the pedals 200, 200' is equal and opposite in direction as is the vertical motion of the left and right-hand sides of the parallel linkage 48. As shown in FIGS. 1 and 3, springs 214, 214' are provided to aid in returning the skis to a normal position from a banked attitude.

IN OPERATION

In operation, the steering of the vehicle is effected in a conventional manner with clockwise or counterclockwise movement of the steering wheel effecting a right or left hand turn of the vehicle, respectively, due to the crossing of the outer portions of cable 162 prior to cable being affixed to arms 108, 110. Due to the inclination of shaft 104 of the front ski mounting assembly 100, ski 16 is inclined when turned to the right or left with the inside edge of the ski being lower than the outside edge of the ski so that the inner edge of the ski will dig into the snow to prevent the ski from slipping sideways over the snow.

The braking of the vehicle is effected by pulling back on control column 138 which pulls cables 184 forward and cables 182 rearward thereby pulling the skis 14, 14' into a snow-plow position. Again, due to the inclined axis of arms 86, 86' of mounting assemblies 80, 80', the inner edges of the skis when in the snow-plow position are lower than the outer edges to aid in the braking action of the skis.

Banking of the vehicle when going over uneven terrain, turning or performing other maneuvers is effected by depressing pedals 200, 200'. The depression of pedal 200 through cable 206 causes the right-hand side of parallel linkage 48 to be raised, while the left-hand side of the parallel linkage is lowered an equal distance. Depression of pedal 200' causes the opposite effect with a left-hand side of parallel linkage 48 being raised, while the right-hand side of the parallel linkage is lowered an equal distance. Of course, it is to be understood that while the operation of the steering, braking and banking assemblies of the ski vehicle have been described separately, these individual control assemblies are operated simultaneously to effect a desired maneuver.

While the means of powering the ski vehicle has not been discussed in great detail, it is to be understood that the vehicle can be towed, propelled by gravity or self-propelled as by means of a motor driven propeller which can be mounted on the vehicle if desired. Further, it is to be understood that although the preferred form of the invention has been shown and described, all suitable modifications and equivalents may be resorted to which fall within the scope of the invention.

I claim:

1. A ski vehicle for substantially duplicating the movements of a skier, said vehicle comprising:

frame means having a longitudinal centerline;

first and second ski means;

parallel linkage means carried by said frame means extending transversely with respect to said longitudinal centerline, and having first and second end portions respectively disposed on opposite sides of said centerline;

first and second mounting means;

said first mounting means disposed on said first end portion of said parallel linkage and operatively connected to said first ski means;

said second mounting means disposed on said second end portion of said parallel linkage and operatively connected to said second ski means;

said parallel linkage permitting vertical movement of said first and second ski means relative to each other;

said mounting means permitting pivotal movement of said first and second ski means about inclined axes;

third ski means pivotally carried by said frame;

foot operated pedal means carried by said frame means and operatively connected to said parallel linkage for banking said vehicle by moving said first and second ski means relative to each other vertically in direct proportion to movements of said pedal means such that a complete reversal of vehicle banking is accomplished by a single traverse of said pedal means;

column means pivotable about a first axis and operatively connected to said mounting means for pivoting said first and second ski means about said inclined axes in direct proportion to movements of said column means about said first axis for braking said vehicle;

wheel means connected to said column means and rotatable about a second axis and operatively connected to said third ski means for pivoting said third ski means in direct proportion to the rotation of said wheel means thus effecting steering of said vehicle;

said pedal means, column means and wheel means being independently and simultaneously operable to effect said respective banking, braking and steering movements independently and simultaneously in any desired amounts; and means for urging said first and second ski means toward their normal operating positions.

2. In the ski vehicle of claim 1:

said parallel linkage means being located at a rear portion of said frame means; and said third ski means being located along said centerline forwardly of said parallel linkage means.

3. A ski vehicle as in claim 1 further comprising cable and pulley means interconnecting said pedal means, said column means and said wheel means with said parallel linkage means, said mounting means and said third ski means respectively.

4. A ski vehicle as in claim 1 wherein said means for urging said first and second ski means toward their normal operating positions is comprised of springs.